(12) United States Patent
Chun

(10) Patent No.: US 12,376,013 B2
(45) Date of Patent: Jul. 29, 2025

(54) PWS SERVICE METHOD IN NPN

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 453 days.

(21) Appl. No.: 17/798,259

(22) PCT Filed: Feb. 15, 2021

(86) PCT No.: PCT/KR2021/001870
§ 371 (c)(1),
(2) Date: Aug. 8, 2022

(87) PCT Pub. No.: WO2021/162498
PCT Pub. Date: Aug. 19, 2021

(65) Prior Publication Data
US 2023/0084683 A1    Mar. 16, 2023

(30) Foreign Application Priority Data

Feb. 11, 2020  (KR) .......................... 10-2020-0016603

(51) Int. Cl.
*H04W 48/16* (2009.01)
*H04W 4/90* (2018.01)
*H04W 48/18* (2009.01)
*H04W 84/04* (2009.01)

(52) U.S. Cl.
CPC ............. *H04W 48/16* (2013.01); *H04W 4/90* (2018.02); *H04W 48/18* (2013.01); *H04W 84/042* (2013.01)

(58) Field of Classification Search
CPC ...................................................... H04W 48/16
USPC ......................................................... 455/434
See application file for complete search history.

(56) References Cited

U.S. PATENT DOCUMENTS

| | | | |
|---|---|---|---|
| 9,554,317 B2 * | 1/2017 | Faccin ................. | H04W 36/24 |
| 2015/0195774 A1 * | 7/2015 | Lee ....................... | H04W 48/12 |
| | | | 370/312 |
| 2020/0382936 A1 * | 12/2020 | Henkle ................. | H04W 76/50 |

OTHER PUBLICATIONS

Qualcomm Incorporated, "Support for emergency services in SNPN", S2-2000817, 3GPP SA WG 2 Meeting #136AH, Incheon, Republic of Korea, Jan. 13-17, 2020, see section 2.
Ericsson, "SIB1 design for NPN", R2-1914628, 3GPP TSG RAN WG2 #108, Reno, USA, Nov. 18-22, 2019, see section 2.3.1.
(Continued)

*Primary Examiner* — Qutbuddin Ghulamali
(74) *Attorney, Agent, or Firm* — BRYAN CAVE LEIGHTON PAISNER LLP

(57) ABSTRACT

One disclosure of the present specification provides a communication method of a terminal which must receive a public warning system (PWS) service. The method may comprise the steps of: searching for one or more first stand-alone non-public networks (SNPNs) to which a terminal is subscribed; receiving, from each of the one or more first SNPNs, first PWS information about whether the respective one or more first SNPNs support a PWS service; and, on the basis of the first PWS information, checking whether a specific first SNPN supporting the PWS service is present among the one or more first SNPNs.

13 Claims, 15 Drawing Sheets

(56) References Cited

OTHER PUBLICATIONS

Ericsson, "Cell Selection and Reselection aspects of NPN", R2-1914626, 3GPP TSG RAN WG2 #108, Reno, USA, Nov. 18-22, 2019, see sections 1-2.3.2.
OPPO, "Key Issue: Support for IMS and emergency services for SNPN", S2-1909242, 3GPP SA WG2 Meeting #135, Split, Croatia, Oct. 14-18, 2019, see sections 1-2.

* cited by examiner

PWS SERVICE METHOD IN NPN

This application is the National Stage filing under 35 U.S.C. 371 of International Application No. PCT/KR2021/001870, filed on Feb. 15, 2021, which claims the benefit of and priority to Korean Application No. 10-2020-0016603, filed on Feb. 11, 2020, the contents of which are all hereby incorporated by reference herein in their entirety.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Non Public Network (NPN) is a 5G system for non-public use. Even when the UE accesses the NPN, the user of the UE should be able to check warning messages such as disaster situations. Therefore, it is necessary for the UE to receive a Public Warning message from the NPN network.

The SNPN corresponds to a network completely independent of the PLMN. Separately from the method in which the UE receives the PWS service from the PLMN, the UE needs to receive the PWS from the SNPN.

SUMMARY

A UE requiring PWS service must also receive PWS service from SNPN. Therefore, the UE may receive the PWS service through the process of finding and connecting to an SNPN that provides the PWS service.

The present specification may have various effects.

For example, by searching for and connecting to an SNPN that provides a PWS service through the procedure disclosed in this specification, a user can receive a PWS service from the SNPN.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DETAILED DESCRIPTION

Figure 1:
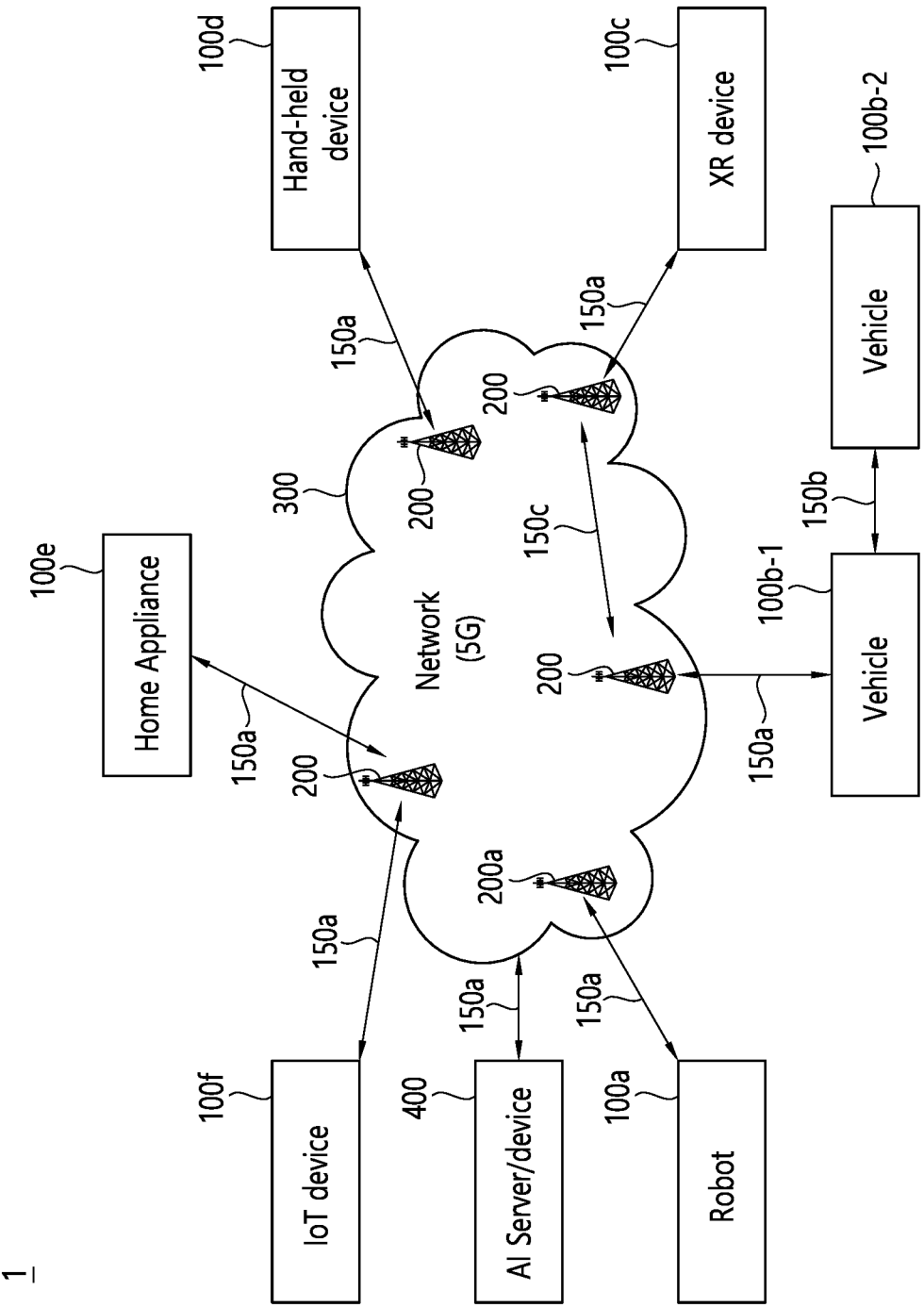
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world.

The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
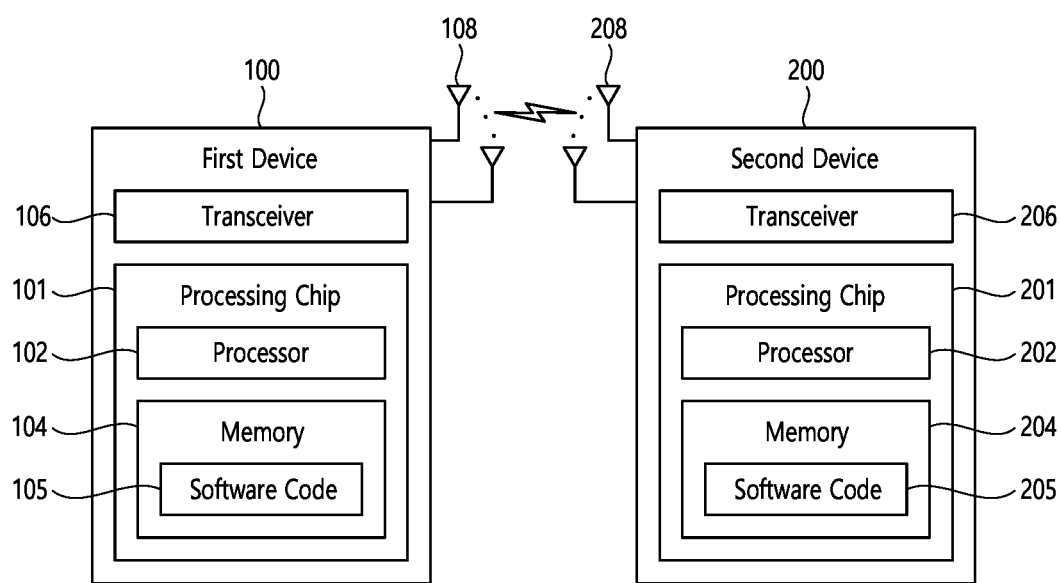
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
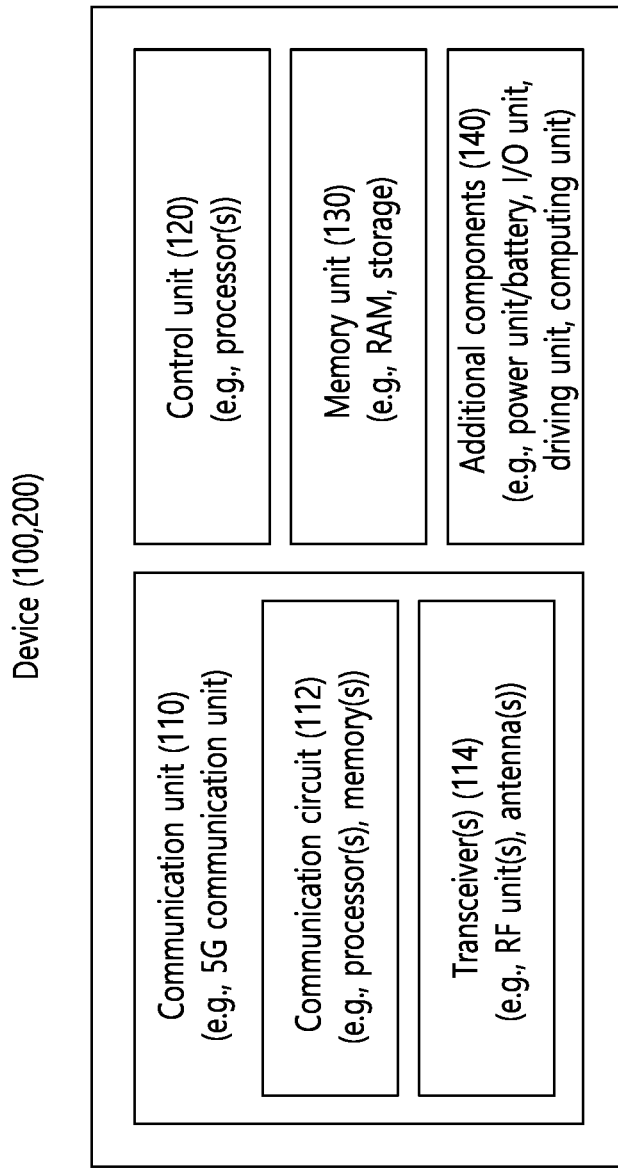
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
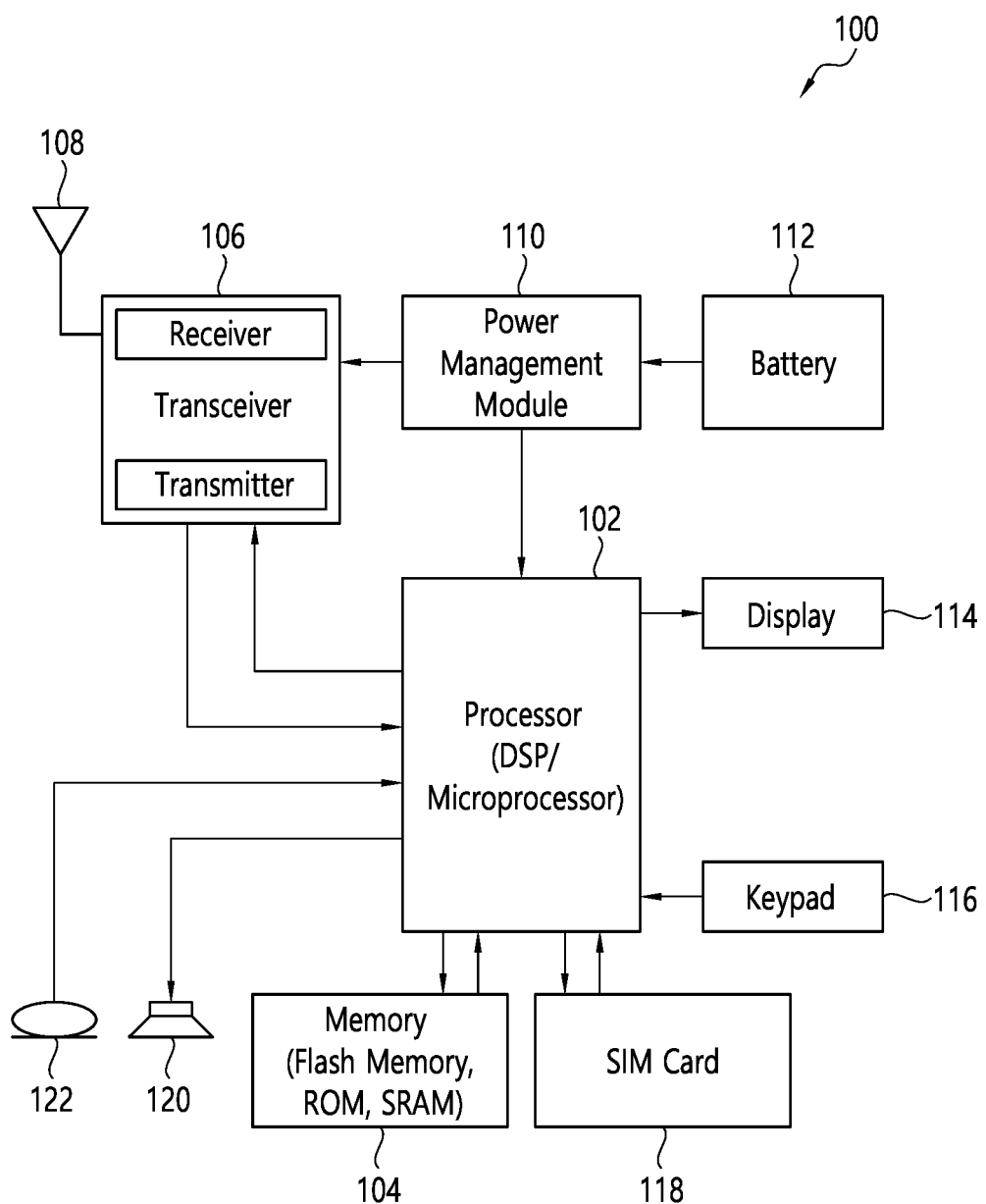
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

The Evolved Packet System (EPS) high-level reference model defined in 3GPP SA WG2 includes a non-roaming case and a roaming case of various scenarios. The network structure diagram of FIG. 5 is a simplified reconstruction of this.

Figure 5:
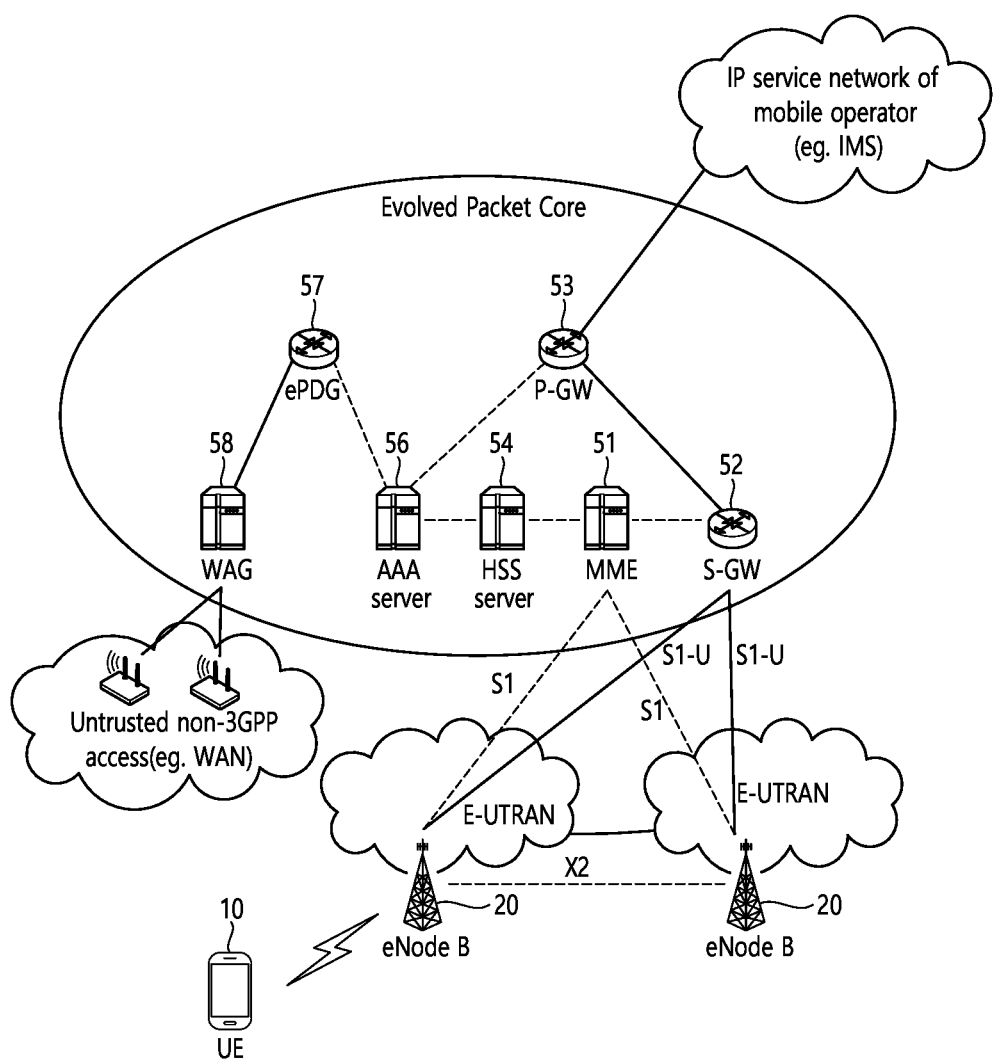
FIG. 5 is a structural diagram of an evolved mobile communication network.

FIG. 5 is a structural diagram of an evolved mobile communication network.

The Evolved Packet Core (EPC) may include various components, and in FIG. 5, some of them correspond to a Serving Gateway (S-GW) 52, a Packet Data Network Gateway (PDN GW) 53, MME (Mobility Management Entity) 51, SGSN (Serving General Packet Radio Service (GPRS) Supporting Node), ePDG (enhanced Packet Data Gateway) is shown.

The S-GW 52 is an element that functions as a boundary point between the radio access network (RAN) and the core network and maintains a data path between the eNodeB 22 and the PDN GW 53. In addition, when a terminal (or User Equipment: UE) moves over an area served by the eNodeB 22, the S-GW 52 serves as a local mobility anchor point. That is, packets may be routed through the S-GW 52 for mobility within the E-UTRAN (Evolved-UMTS (Universal Mobile Telecommunications System) Terrestrial Radio Access Network defined after 3GPP Release-8). In addition, the S-GW 52 is another 3GPP network (RAN defined before 3GPP Release-8, for example, UTRAN or GERAN (Global System for Mobile Communication) (GSM)/EDGE (Enhanced Data rates for Global Evolution) Radio Access Network) and may serve as an anchor point for mobility.

The PDN GW (or P-GW) 53 corresponds to the termination point of the data interface towards the packet data network. The PDN GW 53 may support policy enforcement features, packet filtering, charging support, and the like. In addition, The PDN GW 53 may serve as an anchor point for mobility management with a 3GPP network and a non-3GPP network (For example, an untrusted network such as an Interworking Wireless Local Area Network (I-WLAN), a trusted network such as a Code Division Multiple Access (CDMA) network).

In the example of the network structure of FIG. 5, the S-GW 52 and the PDN GW 53 are configured as separate gateways, but the two gateways may be implemented according to a single gateway configuration option.

The MME 51 is an element that performs signaling and control functions to support access to a network connection of the UE, allocation of network resources, tracking, paging, roaming and handover, etc. The MME 51 controls control plane functions related to subscriber and session management. The MME 51 manages a number of eNodeBs 22 and performs signaling for selection of a conventional gateway for handover to another 2G/3G network. In addition, the MME 51 performs functions such as security procedures, terminal-to-network session handling, and idle terminal location management.

The SGSN handles all packet data such as user's mobility management and authentication to other connected 3GPP networks (e.g., GPRS networks, UTRAN/GERAN).

The ePDG acts as a security node for untrusted non-3GPP networks (e.g., I-WLAN, WiFi hotspots, etc.).

As described with reference to FIG. 5, the terminal (or UE) having IP capability provides 3GPP access as well as non-3GPP access based on various elements in the EPC via various elements provided by the operator (i.e., operator). It can access an IP service network (e.g., IMS).

In addition, FIG. 5 shows various reference points (e.g., S1-U, S1-MME, etc.). In the 3GPP system, a conceptual link connecting two functions existing in different functional entities of E-UTRAN and EPC is defined as a reference point. Table 3 below summarizes the reference points shown in FIG. 5. In addition to the examples in Table 3, various reference points may exist according to the network structure.

TABLE 3

| Reference point | Explanation |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in Idle and/or active state. This reference point can be used intra-PLMN or inter-PLMN (e.g. in the case of Inter-PLMN HO) |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity.) |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 5, S2a and S2b correspond to non-3GPP interfaces. S2a is a reference point that provides the user plane with trusted non-3GPP access and related control and mobility support between PDN GWs. S2b is a reference point that provides related control and mobility support between ePDG and PDNGW to the user plane.

<Next-Generation Mobile Communication>

Figure 6:
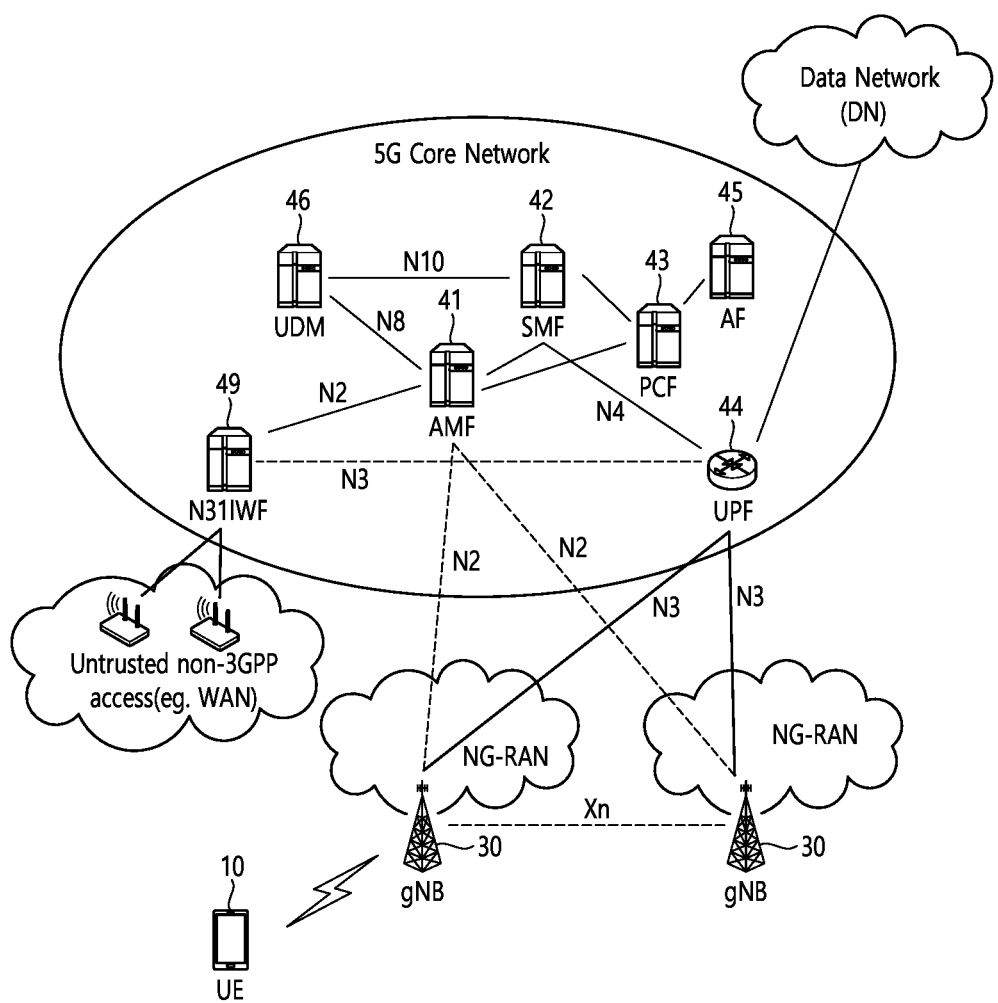
FIG. 6 is a structural diagram of a next-generation mobile communication network.

FIG. 6 is a structural diagram of a next-generation mobile communication network.

5GC (5G Core) may include various components, and in FIG. 6, AMF (Access and Mobility Management Function) 410, SMF (Session Management Function) 420, and PCF (Policy Control) corresponding to some of them Function) 430, UPF (User Plane Function) 440, AF (Application Function) 450, UDM (Unified Data Management) 460, and N3IWF (Non-3GPP InterWorking Function) 490.

The UE 100 is connected to a data network via the UPF 440 through a Next Generation Radio Access Network (NG-RAN) including the gNB 20.

The UE 100 may receive a data service through untrusted non-3rd Generation Partnership Project (non-3GPP) access, for example, a wireless local area network (WLAN). To connect the non-3GPP access to the core network, an N3IWF 490 may be deployed.

Figure 7:
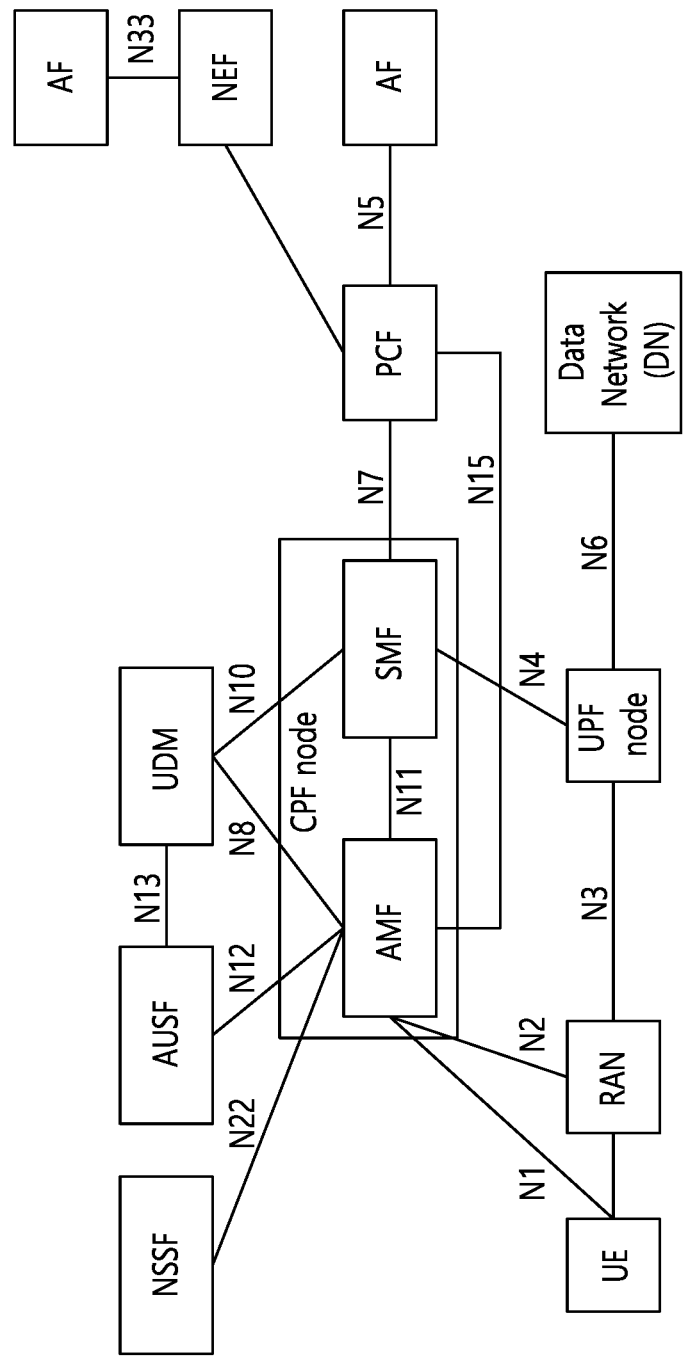
FIG. 7 is an exemplary diagram illustrating an expected structure of next-generation mobile communication from the viewpoint of a node.

FIG. 7 is an exemplary diagram illustrating an expected structure of next-generation mobile communication from the viewpoint of a node.

As can be seen with reference to FIG. 7, the UE is connected to a data network (DN) through a next-generation RAN (Radio Access Network).

The illustrated control plane function (CPF) node carries out all or part of the functions of the MME (Mobility Management Entity) of the 4th generation mobile communication, and out all or part of the control plane functions of a Serving Gateway (S-GW) and a PDN Gateway (P-GW). The CPF node includes an Access and Mobility Management Function (AMF) and a Session Management Function (SMF).

The illustrated User Plane Function (UPF) node is a type of gateway through which user data is transmitted and received. The UPF node may perform all or part of the user plane functions of the S-GW and P-GW of 4G mobile communication.

The illustrated PCF (Policy Control Function) is a node that controls the operator's policy.

The illustrated application function (Application Function: AF) is a server for providing various services to the UE.

The illustrated unified data management (UDM) is a kind of server that manages subscriber information, like a home subscriber server (HSS) of 4G mobile communication. The UDM stores and manages the subscriber information in a Unified Data Repository (UDR).

The illustrated Authentication Server Function (AUSF) authenticates and manages the UE.

The illustrated network slice selection function (NSSF) is a node for network slicing as will be described later.

Figure 8:
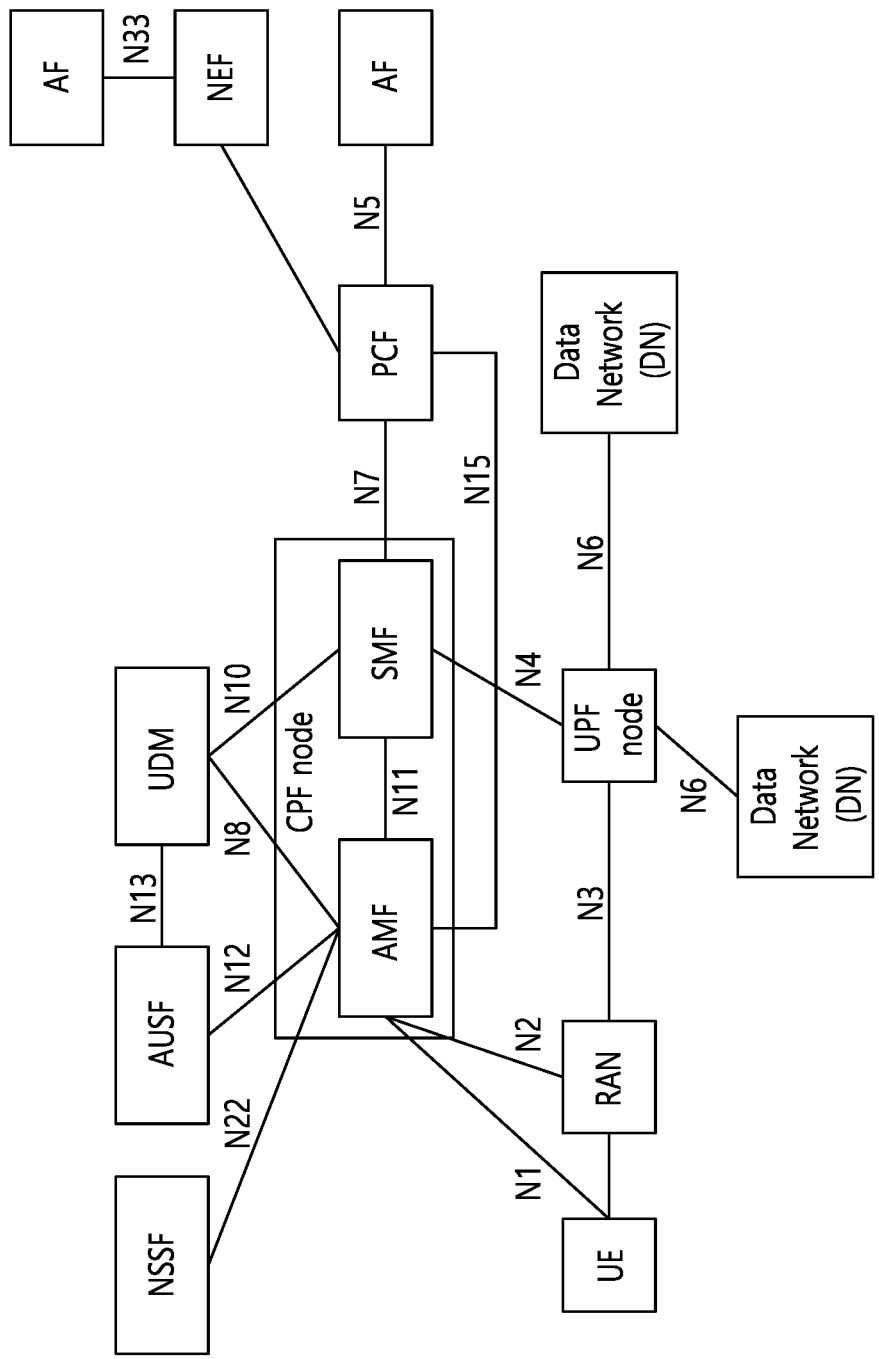
FIG. 8 is an exemplary diagram illustrating an architecture for supporting simultaneous access to two data networks.

In FIG. 8, a UE may simultaneously access two data networks using multiple PDU (protocol data unit or packet data unit) sessions.

FIG. 8 is an exemplary diagram illustrating an architecture for supporting simultaneous access to two data networks.

FIG. 8 shows an architecture for a UE to simultaneously access two data networks using one PDU session.

Reference points shown in FIGS. 7 and 8 are as follows.

N1 represents a reference point between the UE and the AMF.

N2 represents a reference point between (R)AN and AMF.

N3 represents the reference point between (R)AN and UPF.

N4 represents a reference point between SMF and UPF.

N5 represents the reference point between PCF and AF.

N6 represents a reference point between UPF and DN.

N7 represents a reference point between SMF and PCF.

N8 represents a reference point between UDM and AMF.

N9 represents a reference point between UPFs.

N10 represents a reference point between the UDM and the SMF.

N11 represents a reference point between AMF and SMF.

N12 represents a reference point between AMF and AUSF.

N13 represents a reference point between UDM and AUSF.

N14 represents a reference point between AMFs.

N15 represents a reference point between the PCF and the AMF.

N16 represents a reference point between SMFs.

N22 represents a reference point between the AMF and the NSSF.

Figure 9:
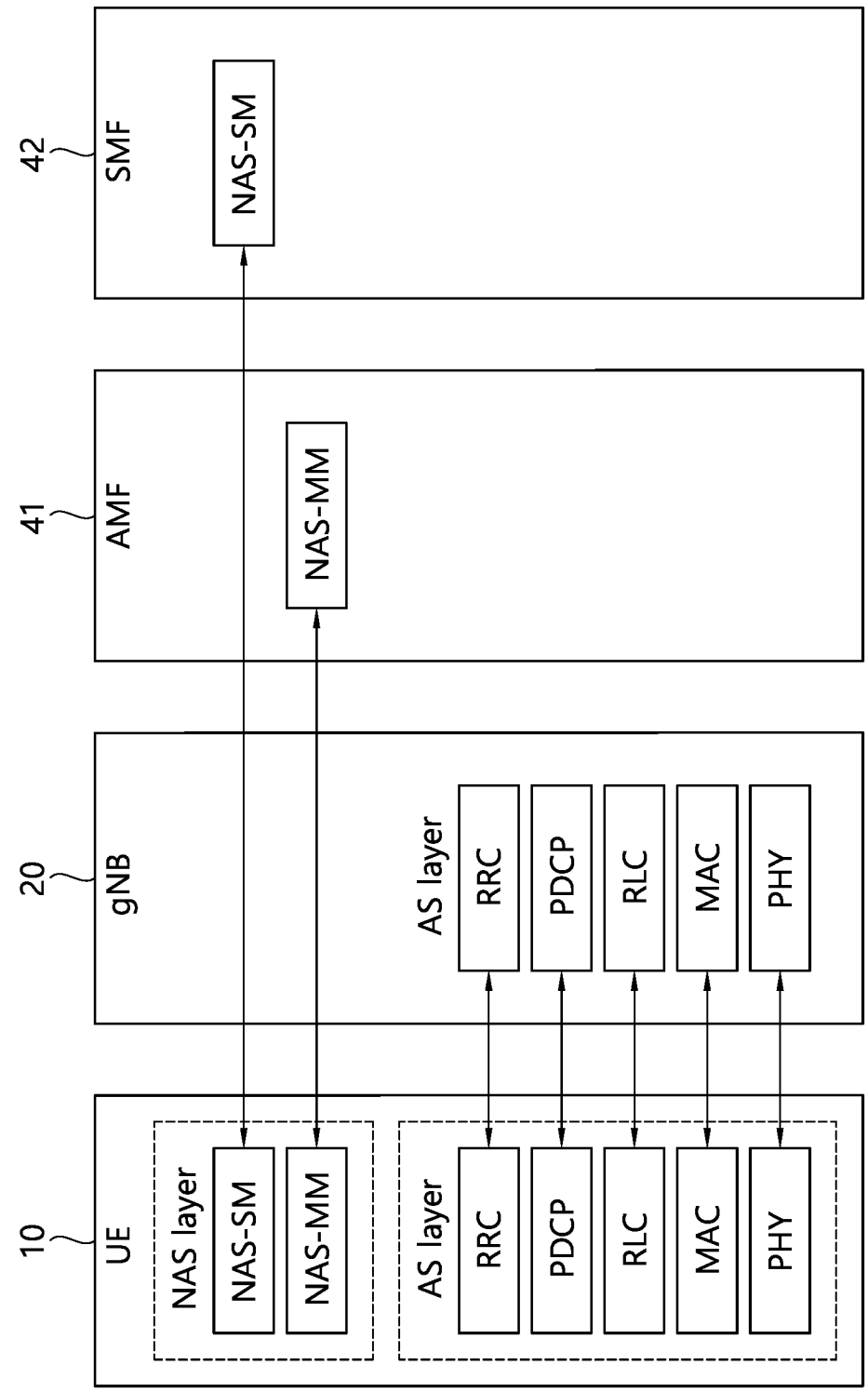
FIG. 9 is another exemplary diagram showing the structure of a radio interface protocol (Radio Interface Protocol) between the UE and the gNB.

FIG. 9 is another exemplary diagram showing the structure of a radio interface protocol (Radio Interface Protocol) between the UE and the gNB.

The radio interface protocol is based on the 3GPP radio access network standard. The air interface protocol is horizontally composed of a physical layer, a data link layer, and a network layer, and vertically a user plane for data information transmission and control. It is divided into a control plane for signal transmission.

The protocol layers are L1 (first layer), L2 (second layer), and L3 (third layer) based on the lower three layers of the open system interconnection (OSI) reference model widely known in communication systems.) can be distinguished.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. And, data is transferred between different physical layers, that is, between the physical layers of the transmitting side and the receiving side through a physical channel.

The second layer includes a Medium Access Control (MAC) layer, a Radio Link Control (RLC) layer, and a Packet Data Convergence Protocol (PDCP) layer.

The third layer includes radio resource control (hereinafter abbreviated as RRC). The RRC layer is defined only in the control plane, is related to the establishment, re-establishment and release of radio bearers (RB), and is responsible for control logical channels, transport channels and physical channels. In this case, the RB means a service provided by the second layer for data transfer between the UE and the E-UTRAN.

The NAS (Non-Access Stratum) layer performs functions such as connection management (session management) and mobility management (Mobility Management).

The NAS layer is divided into a NAS entity for MM (Mobility Management) and a NAS entity for SM (session management).

1) The NAS entity for MM provides the following general functions.
  NAS procedures related to AMF, including the following.
  Registration management and access management procedures. AMF supports the following functions.
  Secure NAS signal connection between UE and AMF (integrity protection, encryption)

2) The NAS entity for SM performs session management between the UE and the SMF.

SM signaling messages are processed, i.e., generated and processed in the NAS-SM layer of the UE and SMF. The content of the SM signaling message is not interpreted by the AMF.

In case of SM signaling transmission,
  The NAS entity for MM creates a NAS-MM message that derives how and where to forward the SM signaling message with a security header indicating the NAS transmission of the SM signaling, additional information about the receiving NAS-MM.
  Upon reception of SM signaling, the NAS entity for SM performs an integrity check of the NAS-MM message, and interprets additional information to derive a method and a place to derive the SM signaling message.

Meanwhile, in FIG. 9, the RRC layer, the RLC layer, the MAC layer, and the PHY layer located below the NAS layer are collectively referred to as an access layer (Access Stratum: AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

<Registration Procedure>

The UE needs to obtain an authorization to enable mobility tracking, to enable data reception, and to receive services. For this, the UE must register with the network. The registration procedure is performed when the UE needs to do initial registration with the 5G system. In addition, the registration procedure is performed when the UE performs periodic registration update, when moving from an idle mode to a new tracking area (TA), and when the UE needs to perform periodic registration update.

During the initial registration procedure, the ID of the UE may be obtained from the UE. AMF can pass PEI (IMEISV) to UDM, SMF and PCF.

Figure 10A:
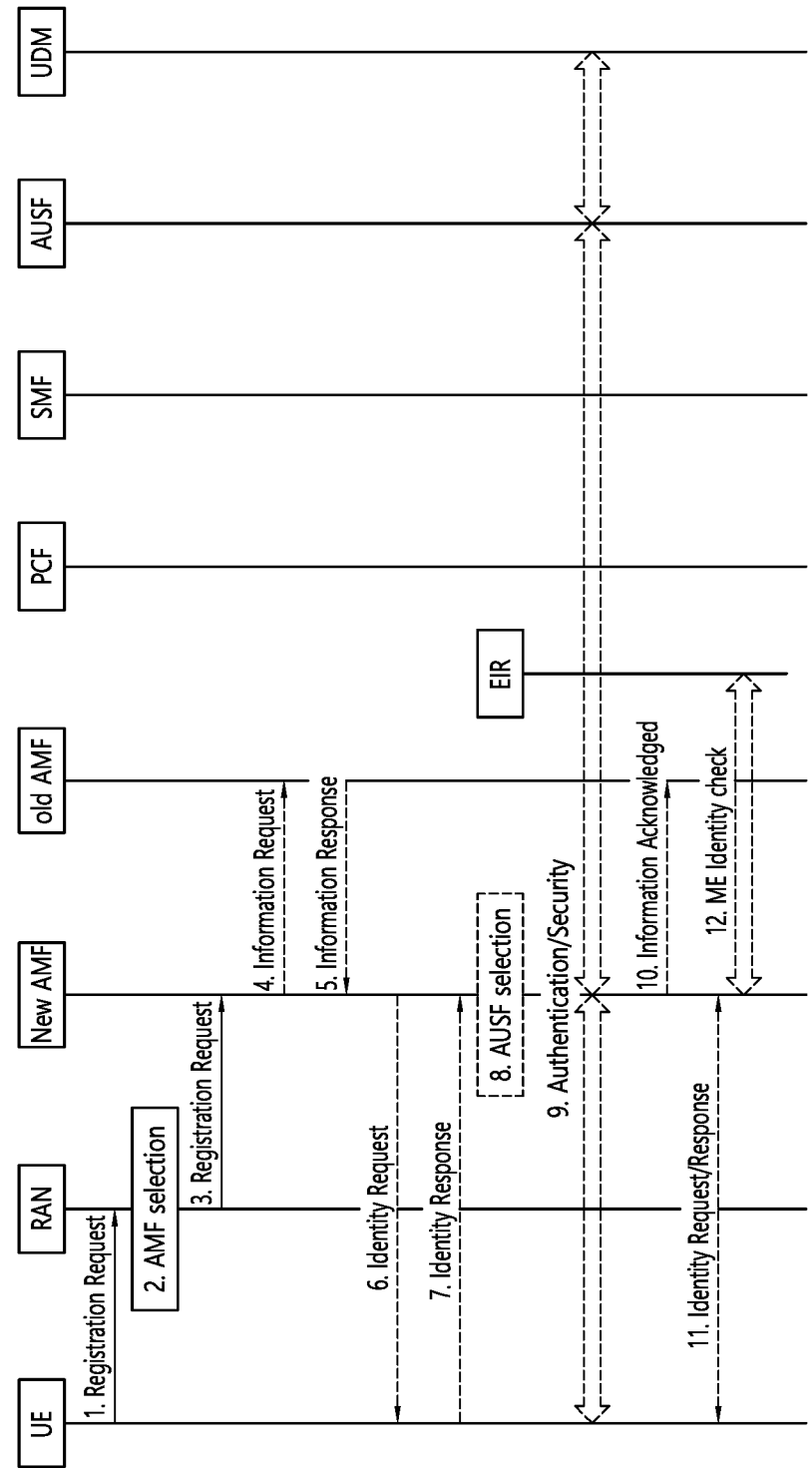
FIG. 10a and FIG. 10b are signal flow diagrams illustrating an exemplary registration procedure.
Figure 10B:
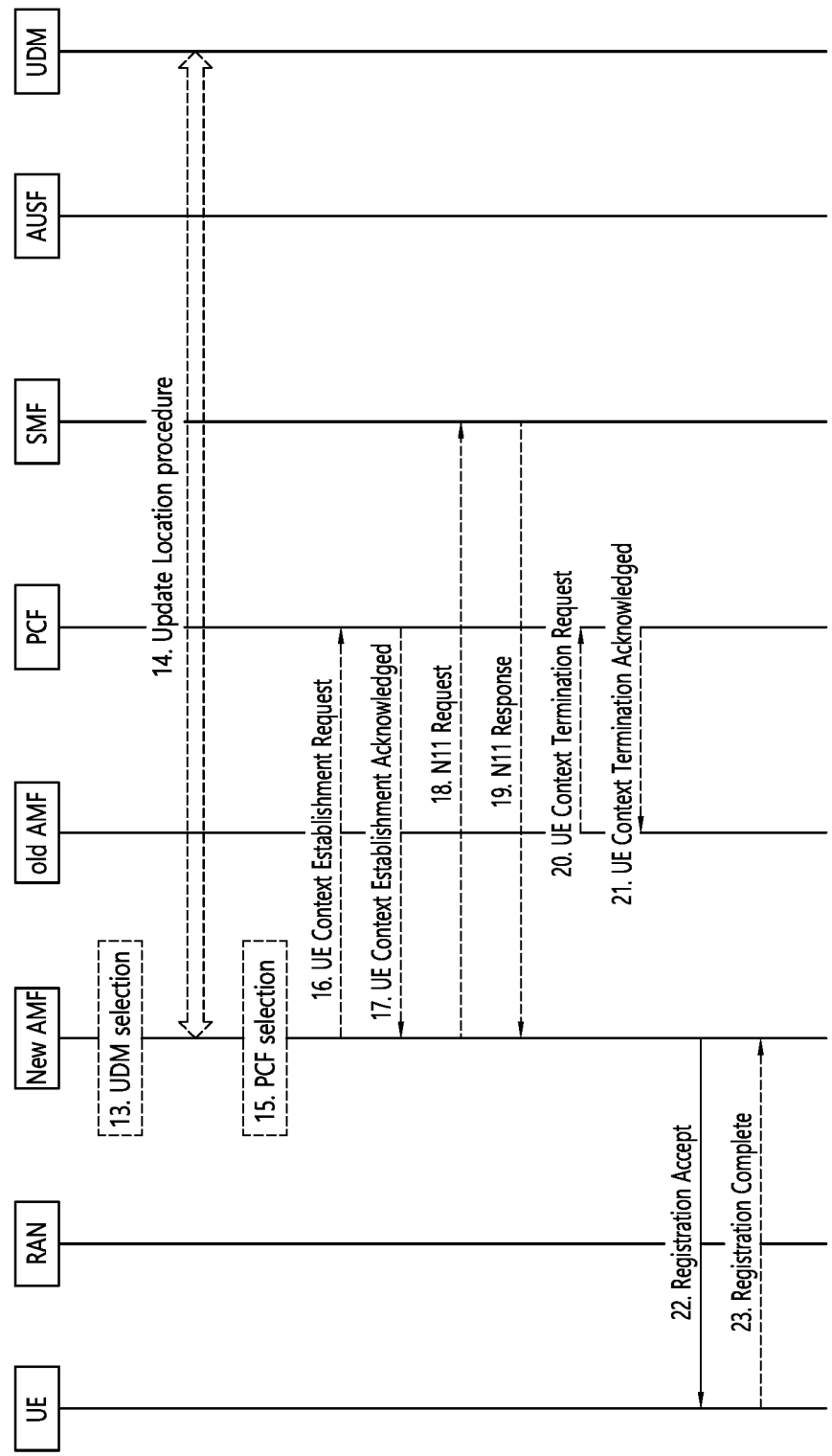

FIG. 10a and FIG. 10b are signal flow diagrams illustrating an exemplary registration procedure.

1) The UE may send an AN message to the RAN. The AN message may include an AN parameter and a registration request message. The registration request message may include information such as registration type, subscriber permanent ID or temporary user ID, security parameters, network slice selection assistance information (NSSAI), 5G capability of the UE, protocol data unit (PDU) session state, and the like.

In the case of 5G RAN, the AN parameters may include a Subscription Permanent Identifier (SUPI) or a temporary user ID, a selected network, and an NSSAI.

The registration type is "initial registration" (i.e. the UE is in a non-registered state), "Mobility registration update" (i.e. the UE is in a registered state and initiates the registration procedure due to mobility) or "Regular registration update" (That is, the UE is in the registered state and starts the registration procedure due to the expiration of the periodic update timer). When the temporary user ID is included, the temporary user ID indicates the last serving AMF. If the UE is already registered via non-3GPP access in a PLMN different from the Public Land Mobile Network (PLMN) of 3GPP access, the UE may not provide the temporary ID of the UE assigned by the AMF during the registration procedure via non-3GPP access.

Security parameters can be used for authentication and integrity protection.

The PDU session state may indicate a (previously established) PDU session usable in the UE.

2) If SUPI is included or the temporary user ID does not indicate a valid AMF, the RAN may select an AMF based on (R)AT and NSSAI.

If the (R)AN cannot select an appropriate AMF, it selects an arbitrary AMF according to a local policy, and transmits a registration request to the selected AMF. If the selected AMF cannot service the UE, the selected AMF selects another more suitable AMF for the UE.

3) The RAN transmits an N2 message to the new AMF. The N2 message includes an N2 parameter and a registration request. The registration request may include registration type, subscriber permanent identifier or temporary user ID, security parameters, NSSAI and MICO mode default settings, and the like.

When 5G-RAN is used, the N2 parameter includes location information related to the cell in which the UE is camping, a cell identifier, and a RAT type.

If the registration type indicated by the UE is periodic registration update, steps 4 to 17 to be described later may not be performed.

4) The newly selected AMF may transmit an information request message to the previous AMF.

If the temporary user ID of the UE is included in the registration request message and the serving AMF has changed since the last registration, the new AMF may send an information request message containing the complete registration request information to the old AMF to request the SUPI and MM context of the UE.

5) The previous AMF transmits an information response message to the newly selected AMF. The information response message may include SUPI, MM context, and SMF information.

Specifically, the previous AMF sends an information response message including the UE's SUPI and MM context.

If the previous AMF has information on the active PDU session, the previous AMF may include SMF information including the ID of the SMF and the PDU session ID in the information response message.

6) The new AMF sends an Identity Request message to the UE if the SUPI is not provided by the UE or retrieved from the previous AMF.

7) The UE transmits an Identity Response message including the SUPI to the new AMF.

8) AMF may decide to trigger AUSF. In this case, the AMF may select the AUSF based on the SUPI.

9) AUSF may initiate authentication of UE and NAS security functions.

10) The new AMF may transmit an information response message to the previous AMF.

If the AMF is changed, the new AMF may transmit the information response message to confirm delivery of the UE MM context.

If the authentication/security procedure fails, registration is rejected and the new AMF can send a rejection message to the old AMF.

11) The new AMF may transmit an Identity Request message to the UE.

If the PEI was not provided by the UE or was not retrieved from the previous AMF, an Identity Request message may be sent for the AMF to retrieve the PEI.

12) The new AMF checks the ME identifier.

13) If step 14 to be described later is performed, the new AMF selects a UDM based on SUPI.

14) If the AMF is changed after the last registration, there is no valid subscription context for the UE in the AMF, or the UE provides a SUPI that does not refer to a valid context in the AMF, the new AMF starts the Update Location procedure. Alternatively, it may be started even when the UDM starts the location cancellation (Cancel Location) for the previous AMF. The old AMF discards the MM context and notifies all possible SMF(s), and the new AMF creates the MM context for the UE after obtaining the AMF related subscription data from the UDM.

When network slicing is used, the AMF obtains the allowed NSSAI based on the requested NSSAI, UE subscription and local policy. Reroute registration requests if AMF is not eligible to support allowed NSSAI.

15) The new AMF may select a PCF based on SUPI.

16) The new AMF transmits a UE Context Establishment Request message to the PCF. The AMF may request an operator policy for the UE from the PCF.

17) The PCF transmits a UE Context Establishment Acknowledged message to the new AMF.

18) The new AMF transmits an N11 request message to the SMF.

Specifically, when the AMF is changed, the new AMF notifies each SMF of the new AMF serving the UE. The AMF verifies the PDU session state from the UE with the available SMF information. When the AMF is changed, available SMF information may be received from the previous AMF. The new AMF may request the SMF to release the network resources related to the PDU session not active in the UE.

19) The new AMF transmits an N11 response message to the SMF.

20) The previous AMF transmits a UE Context Termination Request message to the PCF.

If the previous AMF has previously requested that the UE context be established in the PCF, the old AMF may delete the UE context from the PCF.

21) The PCF may transmit a UE Context Termination Request message to the previous AMF.

22) The new AMF transmits a registration accept message to the UE. The registration acceptance message may include temporary user ID, registration area, mobility restriction, PDU session status, NSSAI, regular registration update timer, and allowed MICO mode.

The registration accept message may include information of the allowed NSSAI and the mapped NSSAI. The allowed NSSAI information for the access type of the UE may be included in the N2 message including the registration accept message. The mapped NSSAI information is information that maps each S-NSSAI of the allowed NSSAI to the S-NASSI of the NSSAI configured for HPLMN.

When the AMF allocates a new temporary user ID, the temporary user ID may be further included in the registration acceptance message. When the mobility restriction is applied to the UE, information indicating the mobility restriction may be additionally included in the registration accept message. The AMF may include information indicating the PDU session state for the UE in the registration accept message. The UE may remove any internal resources associated with a PDU session not marked as active in the received PDU session state. If the PDU session state information is in the Registration Request message, the AMF may include information indicating the PDU session state to the UE in the registration accept message.

23) The UE transmits a registration complete message to the new AMF.

<Public Warning System>

No matter what communication technology you use today, there is an interest in gaining the ability to receive timely and accurate alerts, warnings, and critical information about disasters and other emergencies. During disasters such as earthquakes, tsunamis, hurricanes and wildfires, it is necessary to ensure that appropriate measures are taken to protect families and themselves from serious injury or loss of life or property.

This interest in improving the reliability, resilience and security of alert notifications to the public by providing a mechanism for distributing alert notifications through the 3GPP system leads to the advancement of public warning system technical specifications.

The following list provides high-level general requirements for delivering alert notifications.

PWS (Public Warning System) shall be able to broadcast warning notifications to multiple users simultaneously without authorization.

PWS shall be able to support simultaneous broadcasting of multiple alert notifications.

Alert notifications are broadcast to notification areas based on geographic information specified by the warning notification provider.

A PWS capable UE (PWS-UE) in idle mode shall be able to receive broadcast alert notifications.

NOTE: A low-complexity UE with reduced bandwidth or a UE supporting eDRX may not support all requirements for PWS, including ETWS, CMAS, EU-Alert and KPAS.

PWS shall broadcast warning notifications in the language specified in the regulatory requirements.

Alert notifications are handled in a first-in-first-out manner in the PWS according to regulatory requirements.

Receiving and displaying alert notifications to users does not preempt active voice or data sessions.

Warning notifications are limited to emergencies in which life or property is imminent, and some countermeasures must be taken.

<Non Public Network>

Non Public Network (NPN) is a 5G system for non-public use. NPN is intended for the sole use of private entities such as enterprises and can be deployed in a variety of configurations utilizing both virtual and physical elements. In particular, it may be deployed as a complete standalone network, hosted by a PLMN, or served as a slice of a PLMN.

NPN includes a non-stand-alone NPN method and a SNPN (Standalone-NPN) method. Non-stand-alone NPN is an NPN method supported by PLMN, and SNPN corresponds to a completely independent method from PLMN.

Non-stand-alone NPN may be enabled by using network slicing. In order to prevent unauthorized UEs from accessing the Non-stand-alone NPN, the Closed Access Group (CAG) function may be used.

NPN may be distributed as follows.

Standalone Non-Public Network (SNPN), i.e. operated by an NPN operator and not dependent on network functions provided by the PLMN Public Network Unified NPN, i.e. private network deployed with PLMN support.

Interworking with EPS is not supported in SNPN.

Network slicing may be used to enable public network aggregation NPN.

1. SNPN (1) Identifier

The combination of the PLMN ID and the Network Identifier (NID) identifies the SNPN.

Note 1: The PLMN ID used for SNPN does not have to be unique. PLMN IDs reserved for use in private networks may be used in private networks. PLMN operators can use their own PLMN IDs for SNPNs along with NIDs, but registration in a PLMN and mobility between a PLMN and an SNPN are not supported using an SNPN subscription given that the SNPNs are not relying on network functions provided by the PLMN.

The NID shall support two assignment models.

Self-assignment: NIDs are chosen individually by SNPNs at deployment time (and may therefore not be unique) but use a different numbering space than the coordinated assignment NIDs.

Coordinated assignment: NIDs are assigned using one of the following two options:

1. The NID is assigned such that it is globally unique independent of the PLMN ID used; or 2. The NID is assigned such that the combination of the NID and the PLMN ID is globally unique.

NOTE 2: Which legal entities manage the number space is beyond the scope of this specification.

An optional human-readable network name helps to identify an SNPN during manual SNPN selection.

(2) Broadcast System Information

NG-RAN nodes which provide access to SNPNs broadcast the following information:

One or multiple PLMN IDs

List of NIDs per PLMN ID identifying the non-public networks NG-RAN provides access to NOTE 1: It is assumed that an NG-RAN node supports broadcasting a total of twelve NIDs.

NOTE 2: The presence of a list of NIDs for a PLMN ID indicates that the related PLMN ID and NIDs identify SNPNs.

Optionally a human-readable network name per NID.

NOTE 3: The human-readable network name per NID is only used for manual SNPN selection. The mechanism how human-readable network name is provided (i.e. whether it is broadcasted or unicasted) to the UE is specified.

Optionally information to prevent UEs not supporting SNPNs from accessing the cell, e.g. in case the cell only provides access to non-public networks.

(3) UE Configuration and Subscription Aspects

An SNPN-enabled UE is configured with subscriber identifier (SUPI) and credentials for each subscribed SNPN identified by the combination of PLMN ID and NID.

A subscriber of an SNPN is either:

identified by a SUPI containing a network-specific identifier that takes the form of a Network Access Identifier (NAI) using the NAI RFC 7542 [20] based user identification. The realm part of the NAI may include the NID of the SNPN; or identified by a SUPI containing an IMSI.

An SNPN-enabled UE supports the SNPN access mode. When the UE is set to operate in SNPN access mode the UE only selects and registers with SNPNs over Uu.

Emergency services are not supported in SNPN access mode.

NOTE 1: Voice support with emergency services in SNPN access mode is not specified in this release.

If a UE is not set to operate in SNPN access mode, even if it is SNPN-enabled, the UE does not select and register with SNPNs. A UE not set to operate in SNPN access mode performs PLMN selection procedures. For a UE capable of simultaneously connecting to an SNPN and a PLMN, the setting for operation in SNPN access mode is applied only to the Uu interface for connection to the SNPN.

NOTE 2: Details of activation and deactivation of SNPN access mode are up to UE implementation.

(4) Network Selection in SNPN Access Mode

When a UE is set to operate in SNPN access mode the UE does not perform normal PLMN selection procedures.

UEs operating in SNPN access mode read the available PLMN IDs and list of available NIDs from the broadcast system information and take them into account during network selection.

For automatic network selection, the UE selects and attempts to register with the available SNPN identified by a PLMN ID and NID for which the UE has SUPI and credentials. If multiple SNPNs are available that the UE has respective SUPI and credentials for, then the priority order for selecting and attempting to register with SNPNs is based on UE implementation.

For manual network selection UEs operating in SNPN access mode provide to the user the list of NIDs and related human-readable names (if available) of the available SNPNs the UE has respective SUPI and credentials for.

When a UE performs Initial Registration to an SNPN, the UE shall indicate the selected NID and the corresponding PLMN ID to NG-RAN. NG-RAN shall inform the AMF of the selected PLMN ID and NID.

(5) Network Access Control

If a UE performs the registration or service request procedure in an SNPN identified by a PLMN ID and a self-assigned NID and there is no subscription for the UE, then the AMF shall reject the UE with an appropriate cause code to temporarily prevent the UE from automatically selecting and registering with the same SNPN.

If a UE performs the registration or service request procedure in an SNPN identified by a PLMN ID and a coordinated assigned NID and there is no subscription for the UE, then the AMF shall reject the UE with an appropriate cause code to permanently prevent the UE from automatically selecting and registering with the same SNPN.

In order to prevent access to SNPNs for authorized UE(s) in case of network congestion/overload, Unified Access Control information is configured per non-public network (i.e. as part of the subscription information that the UE has for a given non-public network).

(6) Cell (Re-)Selection in SNPN Access Mode

UEs operating in SNPN access mode only select cells and networks broadcasting both PLMN ID and NID of the selected SNPN.

<PWS in SNPN>

Since the user of the existing mobile communication system was a human being, a human-centered service was basically provided. Accordingly, in the operation of the existing UEs, a registration process may be performed by preferentially selecting a cell or a network in which a service such as a telephone service is provided. If such a cell cannot be found or registration is rejected, the UE may camp on by selecting a cell with a signal above a certain level. In addition, by transitioning to a limited service state in this cell, it is possible to provide a minimum service such as a public warning message.

NPN may be used in a typical university campus or enterprise office environment. The office of a specific company may allow only users belonging to the company to access the NPN specialized for the company due to issues such as security. At this time, a person connected to the NPN will attempt a telephone service using the UE. In this case, since the UE cannot access a plurality of networks at the same time, the UE uses the NPN. For these users, it may be necessary for NPN to transmit the PWS. However, PWS in NPN has not been discussed in the prior art, so it is a problem.

One type of NPN, PNI NPN (Public Network Integrated NPN), is a non-stand-alone NPN, which is supported by the PLMN virtually. In case of the PNI NPN, although the UE logically accesses the NPN, since it is actually connected to the PLMN, servicing the PWS to the UE is not a problem as in the case of a normal PLMN. However, since SNPN is a separate and independent network, this case may be problematic.

However, in the NPN scenario, not only humans but also machines may be users. In particular, in an environment where factory automation is advanced, not only humans but also machines may use advanced communication services such as 4G and 5G using UEs. At this point, the machine will not need to receive PWS information that people understand. Therefore, according to the user and service characteristics, the PWS may be effectively transmitted. This may increase the convenience of installing and operating the network.

The drawings were created to explain a specific example of the present specification. Since the names of specific devices described in the drawings or the names of specific signals/messages/fields are presented by way of example, the technical features of the present specification are not limited to the specific names used in the following drawings.

1. First Disclosure of the Present Specification

Figure 11:
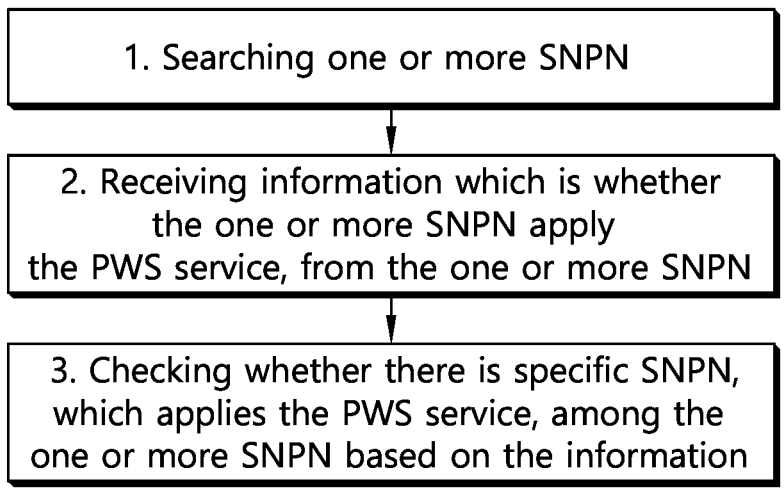
FIG. 11 is a flowchart illustrating an embodiment of the present specification.

FIG. 11 is a flowchart illustrating an embodiment of the present specification.

FIG. 11 shows a flowchart performed by a UE according to an embodiment.

The disclosure of the present specification corresponds to the contents of a UE that needs to be provided with a PWS service. It may be known whether the UE requires the PWS service based on i) the contents stored in the SIM of the UE or ii) the PWS service reception related configuration information received from the network.

As described above, when the user of the UE is a machine, the PWS service may not be required.

The need for PWS service may vary by country, PLMN, or geographic area.

1) The UE may start searching for a network to perform access/registration. As a network, one or more SNPNs may be retrieved.

When the UE enters a new area or turns on the power, 2 step may be performed.

In order for the UE to search for an SNPN, the UE may operate in SNPN Access Mode on. In case of SNPN Access Mode on, the UE may search only SNPN. Conversely, in case of SNPN Access Mode off, the UE may search for PLMN instead of SNPN.

The UE may preferentially search the SNPN to which the UE is subscribed.

2) The UE may receive information on whether the PWS service is supported from one or more SNPNs found in step 1. The SNPN may transmit, to the UE through the SIB, information on whether the PWS service is supported. Whether the PWS service is supported may be expressed in various ways.

3) The UE may check whether a specific SNPN supporting the PWS service exists among the one or more SNPNs based on the information received from the one or more SNPNs in step 2.

A specific SNPN that supports the PWS service may exist among the subscribed SNPNs. Then, the registration procedure may be performed with the specific SNPN, and the PWS service may be provided from the specific SNPN.

A specific SNPN that supports the PWS service may not exist among the subscribed SNPNs. Then, the UE may search for SNPNs not subscribed to, and receive information on whether PWS service is supported from the found SNPN. A specific SNPN that supports the PWS service may exist among SNPNs not subscribed to. Then, the UE may camp on the specific SNPN, and a PWS service may be provided from the specific SNPN to the UE.

If there is no SNPN (SNPN subscribed by the UE and SNPN not subscribed to) supporting the PWS service, the UE may terminate the SNPN Access Mode. At this time, the end of the SNPN Access Mode may be notified to the user. In addition, the UE may search for and select a non-NPN cell supporting the PWS service. The UE may camp on the non-NPN cell and is provided the PWS service. That is, after searching for the PLMN, the PWS service may be received by camp-on.

Figure 12:
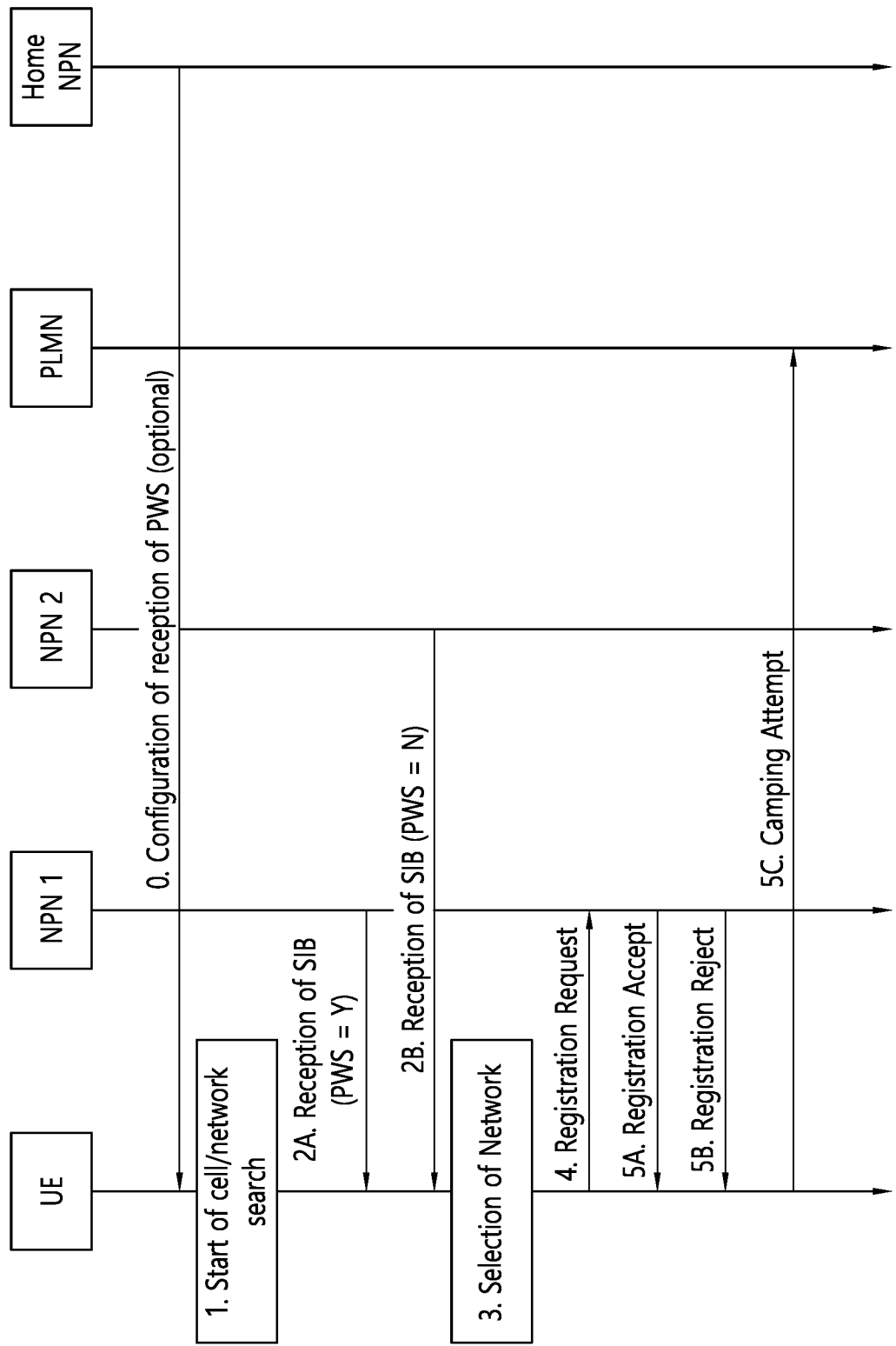
FIG. 12 is a flowchart illustrating one disclosure of the present specification.

FIG. 12 is a flowchart illustrating one disclosure of the present specification.

One type of NPN, PNI NPN (Public-Network-Integrated NPN), is a method that implements NPN virtually in PLMN. Since PLMN provides PWS service, the fact that PNI-NPN implemented on such PLMN provides PWS service to UE is not a problem as in the case of a normal PLMN, but may be a problem in the case of a SNPN. Therefore, NPN notation in the following description may mean SNPN rather than PNI NPN (Public-Network-Integrated NPN).

0) The UE may receive configuration information from the home NPN to which the UE subscribes. In this process, the home NPN may deliver information on whether or not the UE should select a network supporting the PWS service.

The UE may determine whether the PWS service is essential according to the configuration or subscription information. Whether the UE needs the PWS service may be configured differently based on each country, PLMN, or geographic location. The information on whether or not the PWS service is required may be received from the network to the UE as described above or may be stored in the sim of the UE. When stored in the sim of the UE, the reception of the configuration information from the NPN may be omitted.

If the PWS service is not required, a cell may be selected regardless of whether the PWS service is supported or not. For example, a cell with the strongest signal may be selected or a cell supporting a service required by the UE itself may be selected. In addition, when priority information is pre-configured, a network having a high priority may be selected. If there is no information about the selection criteria, a network may be randomly selected.

If the PWS service is essential, the UE subscribing to the SNPN may select a network supporting the PWS service and perform the registration procedure. An example of the process is as follows.)

When the UE enters a new area or turns on, the UE may start searching for a network to access/registration. In order for the UE to search for an SNPN, the UE may operate in SNPN Access Mode on. In case of SNPN Access Mode on, the UE may search only SNPN. Conversely, in the case of SNPN Access Mode off, the UE may search for a non-SNPN cell.

2) The UE may search for an available network in the vicinity and receive a plurality of SIBs from a plurality of networks, respectively. Each network may transmit whether or not the PWS service is supported to the UE through the SIB. For example, NPN 1 may support the PWS service, and NPN 2 may not support the PWS service. NPN 1 may transmit information indicating that the PWS service is supported to the UE through the SIB. NPN 2 may transmit information indicating that the PWS service is not supported to the UE through the SIB. Whether the PWS service is supported may be expressed in various ways.

3) The UE may recognize a network supporting the PWS service based on the information received through the SIB in step 2. The UE may select a network supporting the PWS service. That is, NPN1 supporting PWS service may be selected.

In steps 2 and 3, the UE may first check its own SNPN subscription information to check whether PWS service is provided for the SNPN to which it is subscribed. If the checked SNPN provides the PWS service, the SNPN may be selected. If the checked SNPN does not provide the PWS service, the UE may search for other SNPNs (SNPNs to which it is not subscribed) and check whether the found SNPN provides the PWS service. If another SNPN providing the PWS service is found, the UE may select the SNPN.

Alternatively, if a UE subscribes to a SNPN and the SNPN provides a PWS service, in most cases, the UE will be configured to receive the PWS. Therefore, if a certain UE may find the SNPN to which it has subscribed, the certain UE may access that SNPN. However, if the UE configured to receive the PWS does not find the SNPN to which it subscribes, the UE may check whether there is a SNPN providing the PWS service among the discovered SNPNs to which it has not subscribed. If such a SNPN exists, the UE may perform registration procedure with the SNPN.

4) The UE may perform a registration process with the SNPN selected in step 3. The UE may transmit a registration request message to the SNPN. The registration process may follow the procedures described in FIGS. 10a and 10b. For example, when there is subscription information for NPN1, the UE may transmit a registration request message to NPN1 to perform a registration process with NPN1. However, if there is no subscription information with respect to NPN1 or roaming is not permitted to the NPN1, the registration process is not performed, and in this case, steps 5A and 5B below may be omitted. If NPN1 is allowed to camp on without a registration process, the UE may camp on without performing a registration process in the NPN supporting the corresponding PWS in limited mode.

5A) The UE may receive a registration acknowledgment message from NPN1 as described in step 22 of FIG. 10b. In this case, the UE may receive the PWS service from the corresponding network NPN1.

5B) The UE may receive a registration rejection message from NPN1. In this case, the UE may additionally select another NPN that meets the conditions and perform the registration procedure again.

5C) If there is no NPN successfully registered, or if no NPN allowed for camp on can be found, the UE may search for a PLMN in the vicinity. The UE may camp on the found PLMN.

In steps 2 and 3, the UE may not be able to find an SNPN that provides the PWS service. That is, any discovered SNPN may not provide a PWS. In this case, steps 4, 5A, and 5B described above are omitted. In the process of performing step 5C, in order for the UE to search for a PLMN other than the SNPN, the UE may end the SNPN Access Mode. At this time, the UE may notify the user of information that the SNPN Access Mode has been terminated. The UE may check whether the PWS service is provided in the found cell. If the UE find a cell that provides the PWS service, the UE may camp on by selecting the cell (network).

However, NPN targets a specific user for each special purpose. Accordingly, each NPN may not allow any user to attempt access/registration or camp on itself. Alternatively, each NPN may not allow users who subscribed to it to camp on or access/register at any NPN. In this case, in the above process, if the UE configured to receive the PWS cannot find the SNPN to which it has joined, the UE does not attempt to access other SNPNs nearby and immediately terminates the SNPN access mode. And then the UE may search for PLMN, the UE may camp on the discovered PLMN.

Figure 13:
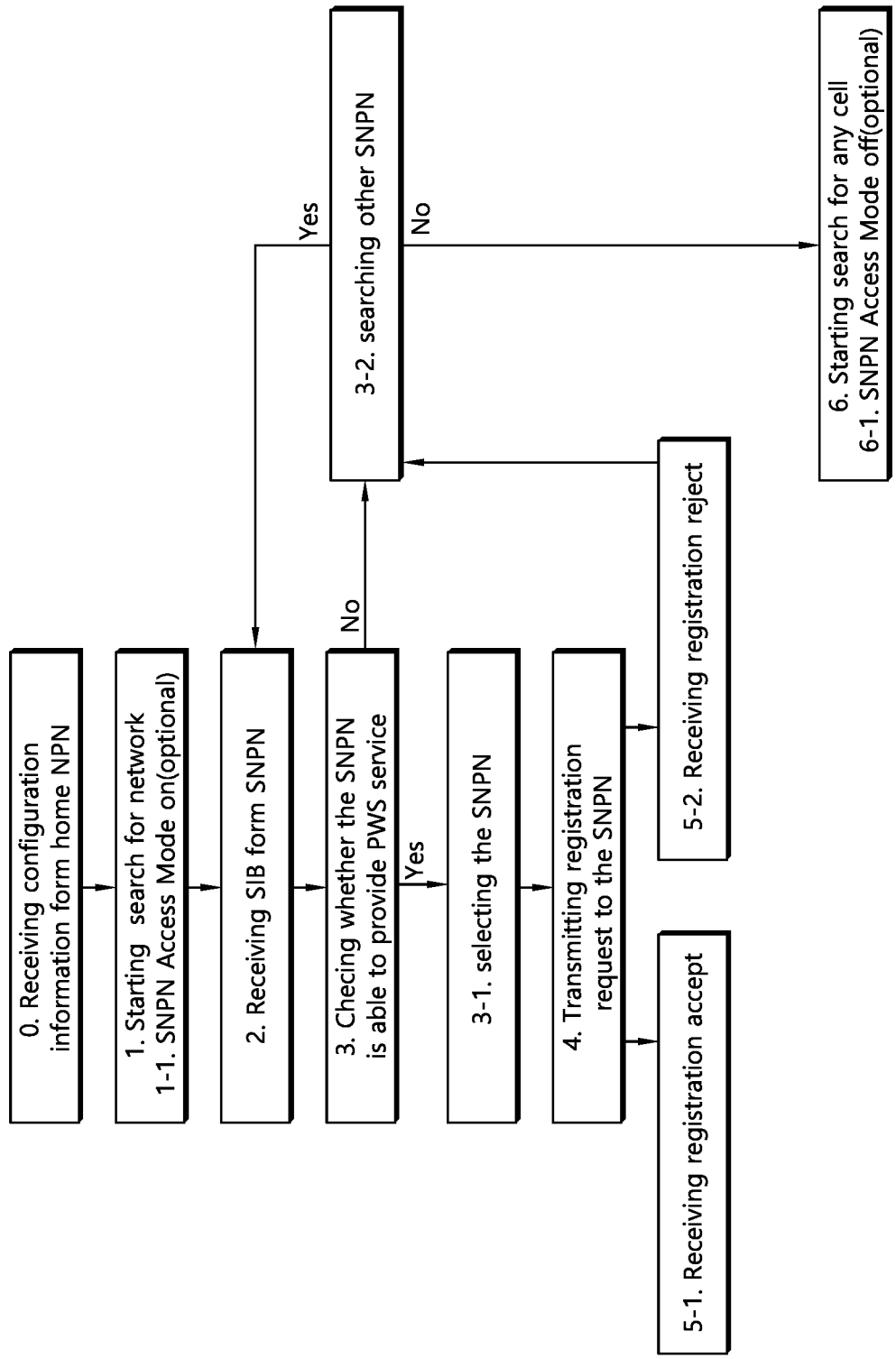
FIG. 13 shows the procedure of the terminal in the first disclosure of the present specification.

FIG. 13 shows the procedure of the terminal in the first disclosure of the present specification.

0) The UE may receive configuration information from the home NPN to which it subscribes. In this process, the UE may receive from the home NPN information on whether the UE itself needs to access a network supporting the PWS service.

The UE may determine whether the PWS service is essential according to the configuration or subscription information. Whether the UE needs the PWS service may be configured differently based on each country, PLMN, or geographic location. The information on whether the PWS service is required or not may be received from the network as described above or may be stored in the sim of the UE. When stored in the sim of the UE, this step may be omitted.

If the PWS service is essential, the UE may select a network supporting the PWS service and perform the registration procedure. An example of the process is as follows.

1) When the UE enters a new area or turns on, the UE may start searching for a network to access/registration.

1-1) The UE subscribed to the SNPN may operate SNPN Access Mode on to search for the SNPN. In case of SNPN Access Mode on, the UE may search only SNPN. Conversely, in the case of SNPN Access Mode off, the UE may search for a PLMN rather than an SNPN. This process is optional.

2) The UE may search for an available SNPN in the vicinity and receive the SIB from the searched SNPN. The UE may first attempt to search from the SNPN to which it has subscribed. The SNPN may transmit, to the UE through the SIB, whether or not the PWS service is supported. Whether the PWS service is supported may be expressed in various ways. If there is no SNPN providing the PWS service among the SNPNs to which the UE has subscribed, the UE may attempt to search for an SNPN to which the UE has not subscribed, and steps 2-5 may be performed for this.

3) The UE may check whether the SNPN supports the PWS service based on the SIB received in step 2.

3-1) If the SNPN supports the PWS service, the UE may select the SNPN as a network to access/register. In this case, steps 4, 5-1, and 5-2 to be described later may be performed.

3-2) If the SNPN does not support the PWS service, the UE may search for an SNPN different from the SNPN that has performed the step 3 procedure. If a different SNPN is found from the SNPN that has performed the step 3 procedure, the procedure may be performed again from step 2 above. In the process of performing this again, the UE may first try from the SNPN to which it has subscribed.

When another SNPN is not found, that is, when an SNPN supporting the PWS service is not found, a six-step procedure to be described later may be performed.

4) The UE may transmit a registration request message to the SNPN selected in step 3.

5-1) The UE may receive a registration approval message from the SNPN. In this case, the UE may receive the PWS service from the SNPN. When the Public Warning message is transmitted to the SNPN, the UE may receive the Public Warning message from the SNPN and deliver it to the user.

5-2) The UE may receive a registration rejection message from the SNPN. In this case, the UE may perform the procedure from step 3-2.

6) If there is no SNPN supporting the PWS service as described above, the UE may perform the following. The UE may terminate the SNPN Access Mode when the SNPN Access Mode is used in step 1-1. The UE may deliver the termination fact to the user. The UE may search for cells other than SNPN (i.e., non-SNPN cells).

The UE may check whether the PWS service is provided by receiving SIB information from other cells as in steps 2-5 described above. Through this process, the UE may select a cell that provides the PWS service. The UE may perform camp-on in the selected cell.

2. Second Disclosure of the Present Specification

In the present specification, when a plurality of networks exist, a method for efficiently providing a PWS service is presented. A specific cell may belong to one or more PLMNs through network sharing. Alternatively, a specific cell may belong to a plurality of CAGs or may belong to a plurality of SNPNs. In this case, if a plurality of PLMNs/CAGs/SNPNs each transmit a Public Warning message, the same message may be duplicated and network resources may be wasted.

To this end, each cell may transmit information on whether it can provide a PWS service (i.e., whether it can transmit a PWS message) to the UE through SIB1. The UE may know whether a cell or a network supports the PWS service based on the information. In addition, by transmitting this information through SIB1, each UE may determine the presence or absence of PWS service in the corresponding cell more quickly and effectively even if the corresponding cell supports one or more PLMN, CAG, SNPN, etc. or a combination thereof.

For example, the information may be a "PWS-Support" field that may be included in SIB1. The "PWS-Support" field may indicate whether the cell supports transmission of the PWS message. When the "PWS-support" field (set to true) is included in SIB1 and transmitted, the UE may determine that the PWS message can be transmitted in the corresponding cell. If the "PWS-support" field is not set to true or is not transmitted because it is included in SIB1, the UE may determine that the PWS message cannot be transmitted in the corresponding cell.

3. Third Disclosure of the Present Specification

Figure 14:
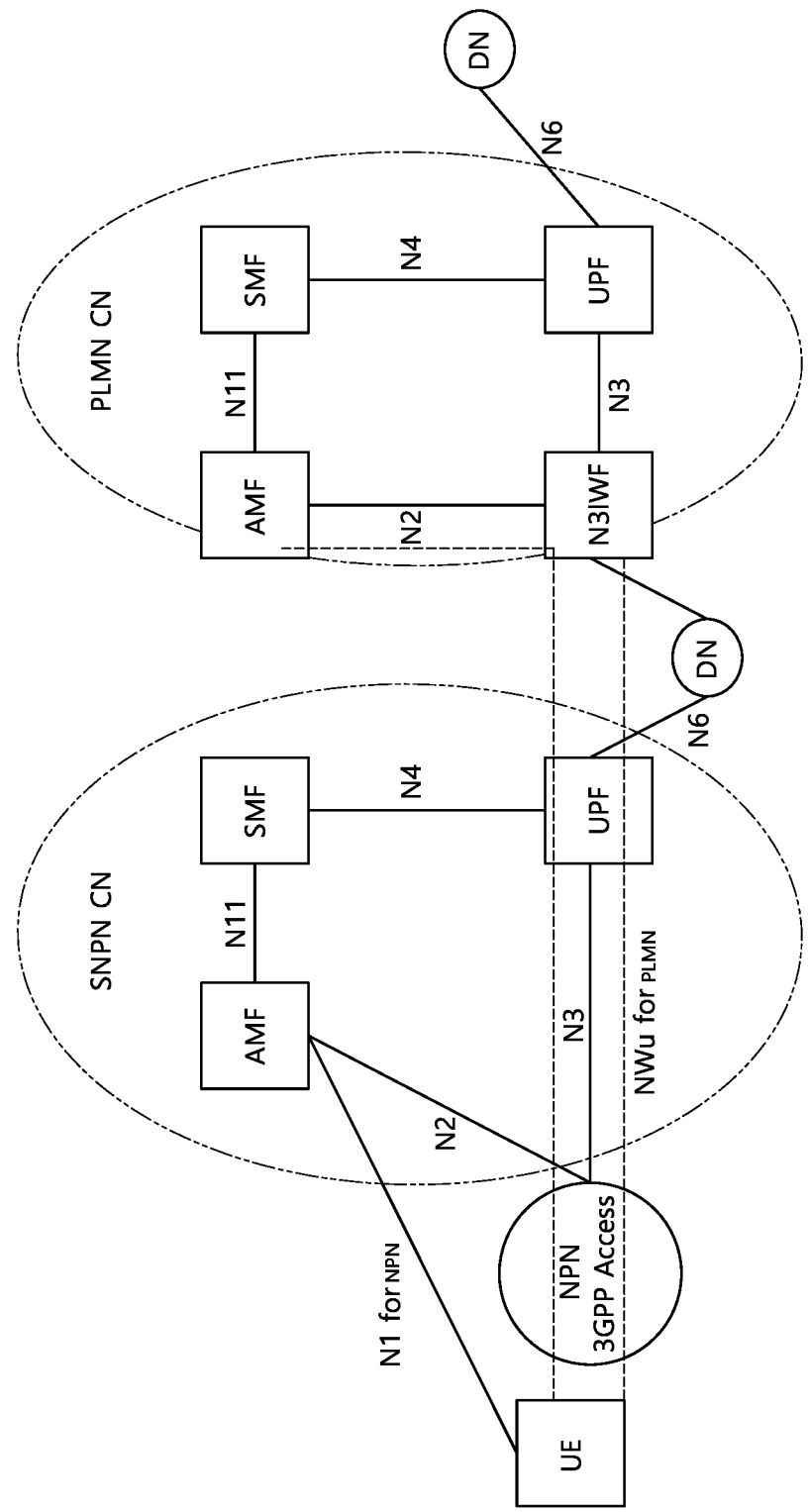
FIG. 14 shows the configuration of the third disclosure of the present specification.

FIG. 14 shows the configuration of the third disclosure of the present specification.

When the UE camps in the NG-RAN of the SNPN, in order to access the PLMN service, the UE first acquires an IP connection to the SNPN, and then may perform connecting to the N3IWF of the PLMN.

In FIG. 14, N1 for NPN indicates a reference point between the UE and the AMF in the SNPN. NWu for PLMN indicates a reference point between the UE and the N3IWF in the PLMN in order to establish a secure tunnel between the UE and the N3IWF of the PLMN through the IP connection service provided by the SNPN.

SNPN may not provide all services provided by PLMN due to its characteristics. The UE uses the SNPN for the service provided by the SNPN, and may additionally access the PLMN through the SNPN to receive a service not provided by the SNPN from the PLMN. For example, a company's NPN may support other services but not PWS services. In this case, the UE may be provided with another service through the communication network of the NPN, and may additionally access the PLMN based on the IP service provided by the NPN to receive the PWS service from the PLMN. In this method, as described in the first disclosure of the present specification, the PWS service may be provided from the PLMN by directly connecting to the PLMN through the SNPN, rather than leaving the SNPN Access Mode or reselecting another network. That is, the PWS message may be received over the IP connection in the unicast method, rather than in the broadcast method directly from the cell through the Uu interface.

The UE may first select a specific SNPN to perform a registration process.

The UE may receive the SIB from the SNPN. The SIB may include information on whether the SNPN provides a PWS service.

If the specific SNPN does not provide the PWS service, the UE may receive the PWS service from the PLMN. In this way, the UE registered with the SNPN may transmit a registration request message to the PLMN to access/register with the PLMN through the user plane provided by the SNPN. In the registration process, the UE may transmit, to the PLMN, information that the UE wants the PWS delivery service. In this case, the information may include information that the PWS service is not supported by the currently registered SNPN.

Upon receiving the registration request message, the PLMN may transmit a registration approval message to the UE. The registration approval message sent to the UE may include information on whether the PWS service is supported.

1) In case the PLMN supports the PWS service

When the PLMN receives a Public Warning message or receives a request to transmit a Public Warning message to the UE from the outside, the PLMN may transmit a Public Warning message to the UE. For this procedure, a control plane method through MME/AMF, etc. may be used, or a user plane method through UPF/P-GW may be used.

In this case, the UE is dual-connected to the SNPN and the PLMN. The user of the UE may receive the PWS service through the PLMN and other services through the SNPN.

2) In case the PLMN does not support the PWS service

The PLMN may inform that the PLMN cannot provide the PWS service in a response message to the registration request message of the UE.

When the UE receives the response of the PLMN, the UE may search for and select an SNPN that provides a PWS service by attempting to access another SNPN as described in the first disclosure.

Alternatively, the PLMN may instruct the UE to stop the SNPN Access mode, the PLMN may instruct the UE to attempt access to another PLMN or SNPN as described in the first disclosure described above.

Through the above process, even when the user's UE requiring the PWS service accesses/registers the SNPN, the user may receive the PWS service. The above-described embodiment is not limited to the PWS service and may be applied to other services.

For example, if the UE subscribed only to the PLMN does not find any PLMN that can camp on, the UE may search for an available NPN in the vicinity. If there is an NPN that notifies that it provides PWS service among the NPNs found by searching, it is possible for the UE to camp on by selecting the corresponding NPN.

The specification may have various effects.

For example, by searching for and connecting to an SNPN that provides a PWS service through the procedure disclosed in this specification, a user can receive a PWS service from the SNPN.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A method comprising:
based on a user equipment (UE) being set to operate in a stand-alone non-public network (SNPN) access mode, selecting and registering with at least one first SNPN for which the UE has subscription permanent identifiers (SUPIs) and credentials, which comprises:
i) reading system information from the at least one first SNPN;
ii) selecting a specific first SNPN from among the at least one first SNPN; and
iii) attempting to register with the specific first SNPN using the credentials,
wherein the system information includes public warning system (PWS) information related to whether the at least one first SNPN supports a PWS service; and
wherein selecting of the specific first SNPN comprises:
i) checking whether the specific first SNPN supports the PWS service based on the PWS information; and
ii) selecting the specific first SNPN from among the at least one first SNPN based on the specific SNPN supporting the PWS.

2. The method of claim 1, further comprising:
receiving a PWS message from the specific first SNPN.

3. The method of claim 1, further comprising:
searching at least one public land mobile network (PLMN) based on any of the at least one first SNPN not supporting the PWS service; and
performing camp-on to a specific PLMN from among the at least one PLMN.

4. The method of claim 3, further comprising:
receiving a PWS message from the specific PLMN.

5. The method of claim 1, further comprising:
searching for at least one second SNPN for which the UE does not have the SUPIs or the credentials, based on any of the at least one first SNPN not supporting the PWS service;
receiving second PWS information related to whether the at least one second SNPN supports the PWS service from the at least one second SNPN;
checking whether a specific second SNPN from among the at least one second SNPN supports the PWS service based on the second PWS information; and
performing camp-on to the specific second SNPN based on the specific second SNPN supporting the PWS service.

6. The method of claim 5, further comprising:
searching at least one PLMN, based on any of the at least one second SNPN not supporting the PWS service,
performing camp-on to a specific PLMN from among the at least one PLMN; and
receiving a PWS message from the specific PLMN.

7. A user equipment (UE) comprising:
at least one transceiver;

at least one processor; and at least one memory operably connectable to the at least one processor and storing instructions that, based on being executed by the at least one processor, perform operations comprising:

based on a user equipment (UE) being set to operate in a stand-alone non-public network (SNPN) access mode, selecting and registering with at least one first SNPN to for which the UE has subscription permanent identifiers (SUPIs) and credentials, which comprises:

i) reading, via the at least one transceiver, system information from the at least one first SNPN;

ii) selecting a specific first SNPN from among the at least one first SNPN; and iii) attempting to register with the specific first SNPN using the credentials, wherein the system information includes public warning system (PWS) information related to whether the at least one first SNPN supports a PWS service, and wherein selecting of the specific first SNPN comprises:

i) checking whether the specific first SNPN supports the PWS service based on the PWS information; and ii) selecting the specific first SNPN from among the at least one first SNPN based on the specific SNPN supporting the PWS.

8. The UE of claim 7, wherein the operations further comprise receiving a PWS message from the specific first SNPN.

9. The UE of claim 7, wherein the operations further comprise:

searching at least one public land mobile network (PLMN), based on any of the at least one first SNPN not supporting the PWS service; and performing camp-on to a specific PLMN from among the at least one PLMN.

10. The UE of claim 9, the operations further comprise receiving a PWS message from the specific PLMN.

11. The UE of claim 7, wherein the operations further comprise:

searching for at least one second SNPN for which the UE does not have the SUPIs or the credentials, based on any of the at least one first SNPN not supporting the PWS service, receiving second PWS information related to whether the at least one second SNPN supports the PWS service from the at least one second SNPN;

checking whether a specific second SNPN from among the at least one second SNPN supports the PWS service based on the second PWS information; and performing camp-on to the specific second SNPN based on the specific second supporting the PWS service.

12. The UE of claim 11, wherein the operations further comprise:

searching at least one PLMN, based on any of the at least one second SNPN not supporting the PWS service;

performing camp-on to a specific PLMN from among the at least one PLMN; and receiving a PWS message from the specific PLMN.

13. A processing apparatus, adapted to control a wireless device, comprising:

at least one processor; and at least one memory storing instructions and operably electrically connectable with the at least one processor, wherein the at least one processor is adapted to perform operations comprising:

based on a user equipment (UE) being set to operate in a stand-alone non-public network (SNPN) access mode, selecting and registering with at least one first SNPN for which the wireless device has subscription permanent identifiers (SUPIs) and credentials, which comprises;

i) reading system information from the at least one first SNPN;

ii) selecting a specific first SNPN from among the at least one first SNPN; and iii) attempting to register with the specific first SNPN using the credentials, wherein the public warning system (PWS) information related to whether the at least one first SNPN supports a PWS service, and wherein selecting of the specific first SNPN comprises:

i) checking whether the specific first SNPN supports the PWS service based on the first PWS information; and ii) selecting the specific first SNPN from among the at least one first SNPN based on the specific SNPN supporting the PWS.

* * * * *